United States Patent [19]

Merklinger

[11] 4,119,942
[45] Oct. 10, 1978

[54] ACOUSTIC DIRECTION FINDER

[76] Inventor: Harold M. Merklinger, P.O. Box 15, Stewiacke, Nova Scotia, Canada

[21] Appl. No.: 703,280

[22] Filed: Jul. 7, 1976

[30] Foreign Application Priority Data

Jul. 8, 1975 [CA] Canada .................................. 231036

[51] Int. Cl.$^2$ .............................................. G01S 3/80
[52] U.S. Cl. .................................. 340/6 R; 340/16 R; 343/113 R
[58] Field of Search .................. 343/113 R; 340/6 R, 340/16 R; 324/47, 43 G; 33/360

[56] References Cited

U.S. PATENT DOCUMENTS

| 3,763,465 | 10/1973 | Tatge et al. | 340/6 R |
| 3,838,389 | 9/1974 | Buddruss et al. | 340/6 R |
| 3,935,575 | 1/1976 | Leisterer et al. | 340/6 R |

FOREIGN PATENT DOCUMENTS 1,766,755  8/1971  Fed. Rep. of Germany .......... 340/6 R Primary Examiner—Nelson Moskowitz
Assistant Examiner—Lawrence Goodwin
Attorney, Agent, or Firm—Charles A. Laff; J. Warren Whitesel; Howard B. Rockman

[57] ABSTRACT

An acoustic direction finder which identifies and displays bearing of an underwater received signal without the requirement of scanning the ambient space. The output signals of hydrophones at the ends of a pair of orthogonally located dipoles are applied to differential amplifiers to provide orthogonal dipole response characteristics, and an in-phase sum of the signal at the center of the dipoles is obtained. The differential amplifier output signals are integrated and the resultant signals are applied to individual multiplying means with the sum signal whereby a pair of X and Y coordinate deflection signals are obtained, which are applied to a display device.

5 Claims, 8 Drawing Figures

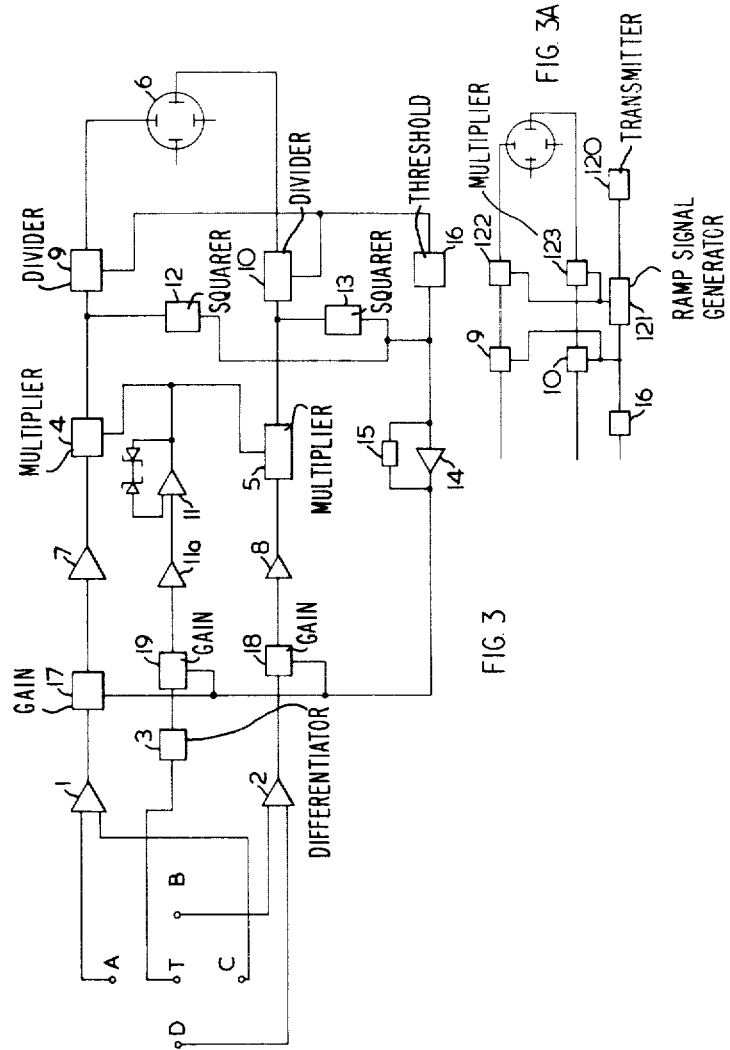

ACOUSTIC DIRECTION FINDER

This invention relates to a system for determining the direction of reception of an acoustic pressure signal, and which is particularly useful for determining the source of the signal or a discrete noise source underwater.

Systems for detecting the source of acoustic signal underwater, as in sonar systems, commonly determine the bearing of an incoming signal by scanning the ambient space, by examining the output of several stable direction reception beams, etc. The present invention provides a structure for determining the direction of a signal source instantaneously by processing the output of an array of fixed hydrophones. There is no requirement for scanning or estimating based on a multiple beam receiver array.

The hydrophone array in the present invention may be extremely simple, and the resultant output indication provides a direct bearing and/or elevation signal indication on a display device such as a cathode ray tube. The direction of reception of such a signal can, by the use of this invention, be determined in three dimensions.

The invention requires at least two dipole electro-acoustic transducer means which are disposed in quadrature. The dipoles can usefully be two pairs of omnidirectional pressure transducers, each transducer of a respective pair being separated from the other a distance much less than the wavelength of the expected signal to be received. The transducers are equally separated from the centre point of the array.

Each of a pair of differential amplifiers is connected to a respective transducer means for providing a pair of differential signals related to the acoustic pressure difference of said acoustic signal detected along each of the dipoles. Means is also provided for obtaining a sum signal of the acoustic signal received by the transducer means in phase. The sum signal can be obtained by adding in phase the signals received by the hydrophones, or alternatively, and preferably, a single omnidirectional electroacoustic transducer is located at the centre of the array whereby the sum is obtained as an output signal.

The structure also utilizes a pair of multiplying means for providing a pair of display deflection signals. Means is provided for causing the aforenoted sum signal to be differentiated with respect to time relative to the output signals of the pair of differential amplifiers, whereby a pair of dipole resultant signals and a common signal are obtained. Each of the respective dipole resultant signals and the common signal are applied to the respective multiplying means, and the output of which are deflection signals which are applied to the deflection circuitry of a display device.

It should be noted that the requirement that the sum signal be differentiated relative to the output signals of the pair of differential amplifiers can be satisfied either by differentiating the sum signal itself, or by retaining the sum signal, and integrating the output signals of the pair of differential amplifiers.

A better understanding of the invention will be obtained by reference to the description below, and to the following figures, in which.

Figure 3B:
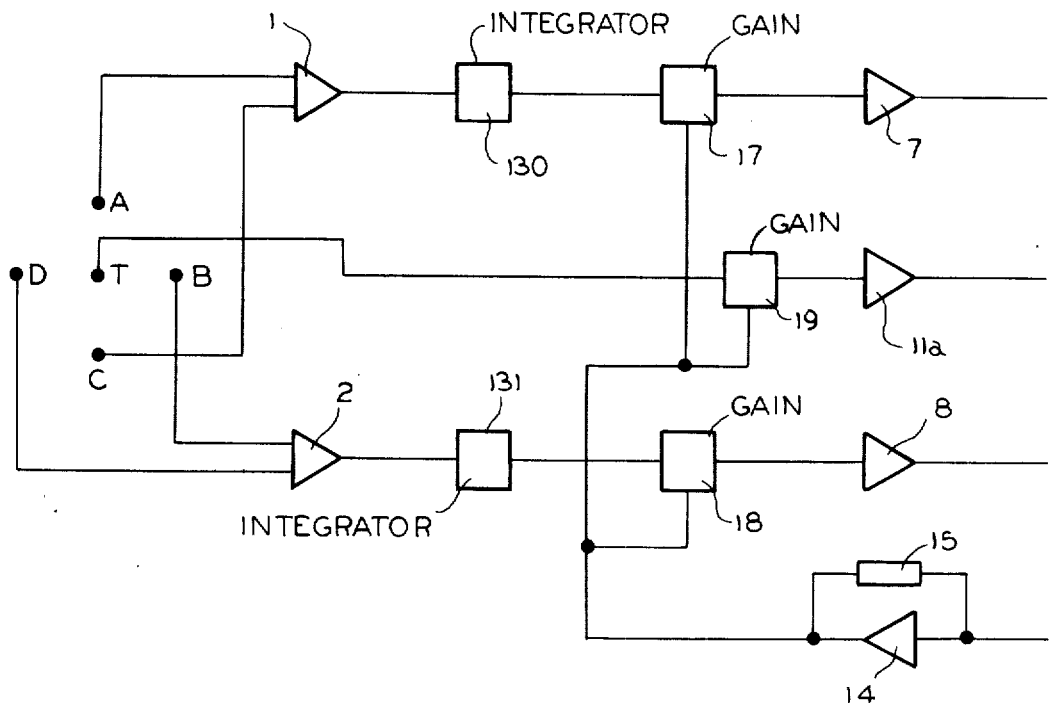
FIG. 3 is a block diagram of the invention in more complex form.
Figure 4:
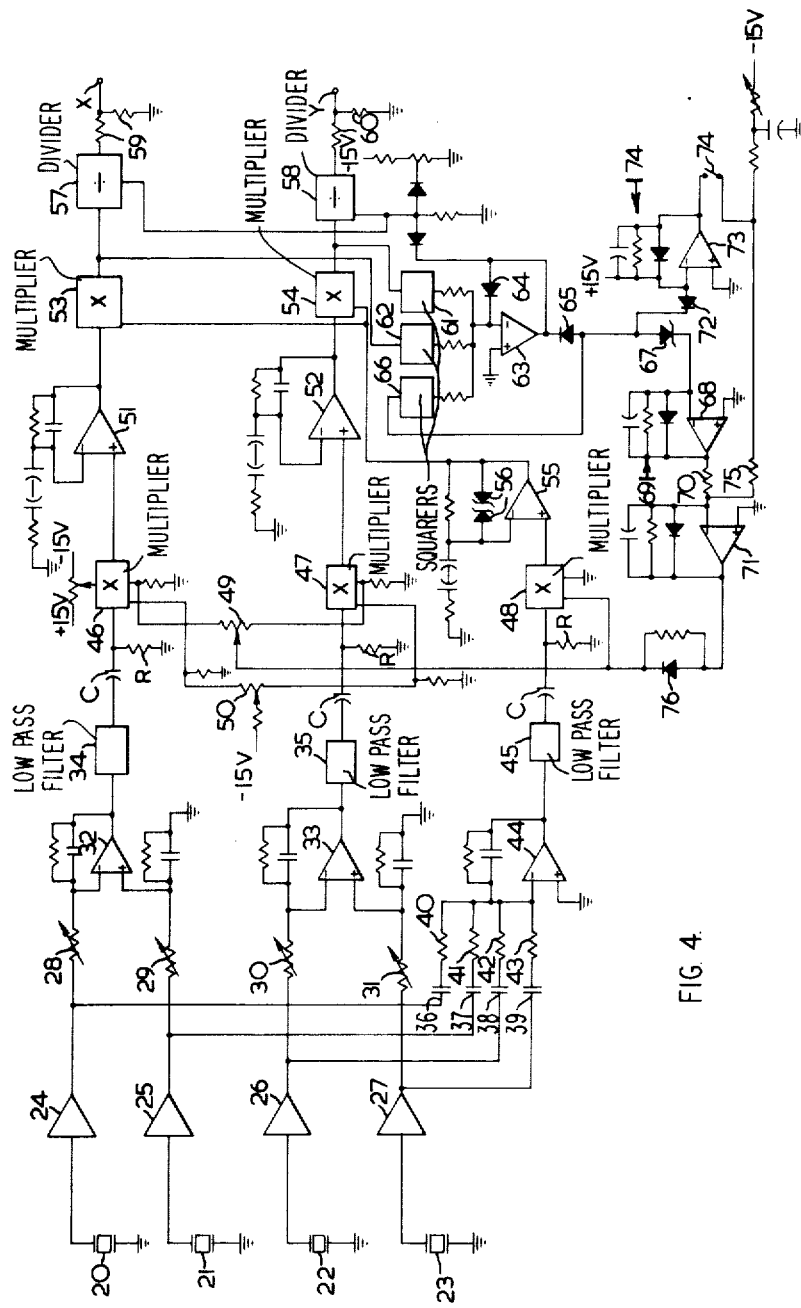

FIG. 3A being a variation of a portion thereof;

FIG. 3B is based on FIG. 3 except that it shows a portion thereof with integration rather than differentiating means;

FIG. 4 is a schematic diagram of the invention; and

Figure 4A:
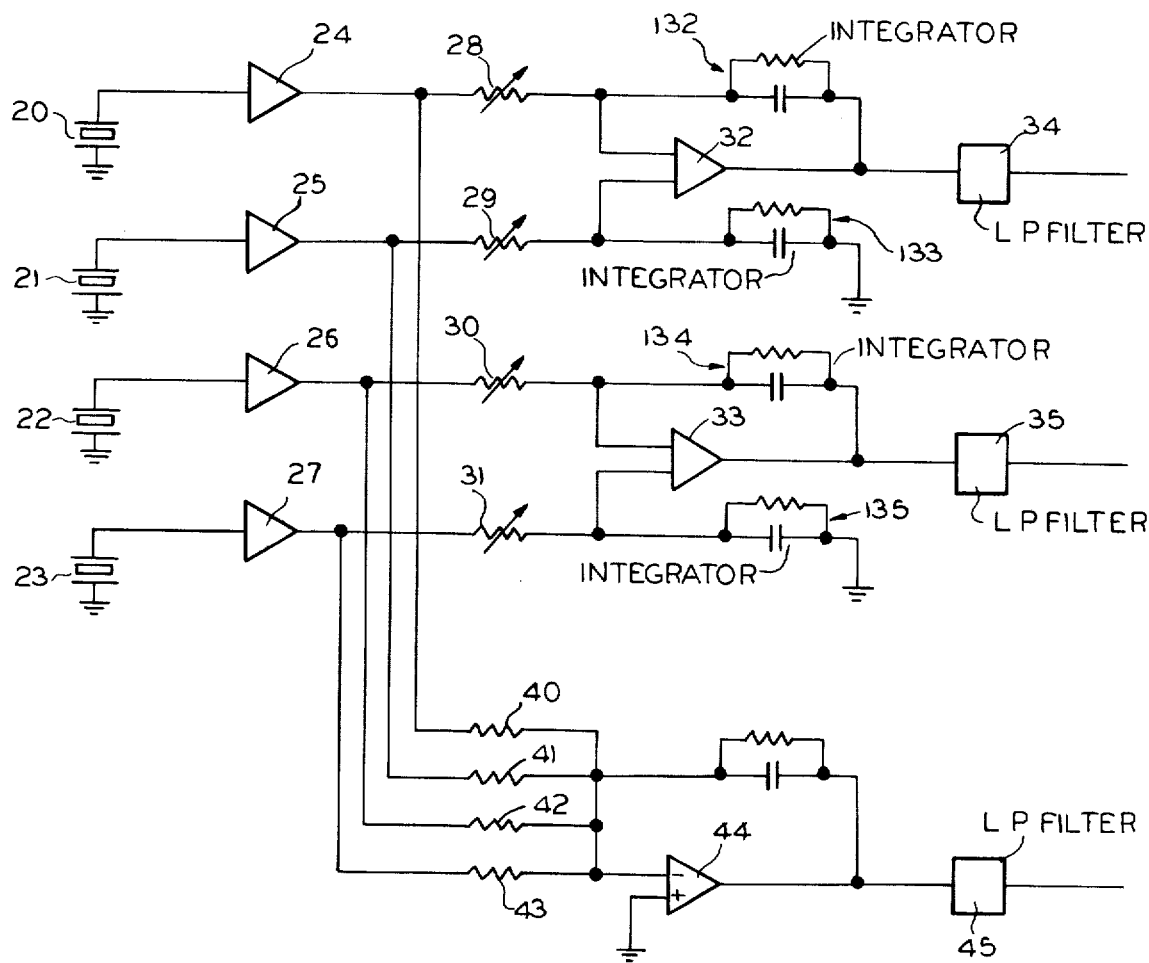

FIG. 4A is based on FIG. 4 except that it shows a portion thereof with integration rather than differentiation means.

Figure 1:
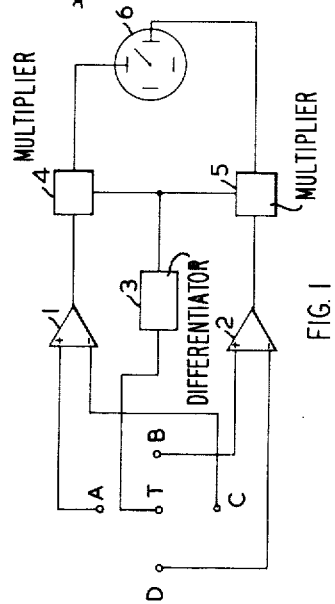
FIG. 1 is a basic block diagram of the invention in its simplest form.

Turning now to FIG. 1, a dipole electric-acoustic transducer means is shown made up of hydrophones A and C, and a second dipole electro-acoustic transducer means is arranged in quadrature thereto, as hydrophones B and D. The output signals of the pressure sensitive transducers are added in antiphase, which will cause a directional output response which is proportional to the cosine of the arrival angle of an incident acoustic signal wave. The second dipole transducer means, when combined in the aforenoted manner, will provide an output which is dependent on the sine of the angle of the incident acoustic signal wave.

Of course, rather than pairs of pressure sensitive transducers, individual pressure gradient or velocity units may be used. Moreover, a multiplicity of transducers can be used to form each dipole; the length of each dipole being much shorter than a wavelength of the acoustic signal to be processed.

A sum signal is obtained by providing an omnidirectional pressure sensitive unit T at the centre of the hydrophone array, although the unit T can be eliminated and a sum signal derived from all of the transducers.

The output signal of each hydrophone in a dipole is applied to a differential amplifier. Hydrophones A and C are connected to differential amplifier 1, and hydrophones B and D are connected to differential amplifier 2. The output signals of each provide an approximate dipole response curve as dipole resultant signals.

A sum signal is obtained from hydrophone T. In the embodiment shown in FIG. 1, the sum signal is differentiated in differentiation circuit 3, to provide an output common signal.

The dipole resultant output signal from differential amplifier 1 is applied to multiplier 4, along with the common signal from differentiation circuit 3. Similarly, the dipole resultant output signal from differential amplifier 2 is applied to multiplier 5 along with the common signal from differentiation circuit 3.

The output signals from each of the multipliers 4 and 5 are deflection signals or their equivalent, which are applied to the deflection circuitry of a display device 6. Preferably the display device is the cathode ray tube of an oscilloscope, and the deflection signals are applied to the X and Y coordinate deflection circuits thereof. The resultant signal appears on the screen as a line extending outwardly from a centre point on the screen, the bearing of which line indicates the bearing of a received signal, where the two hydrophone arrays are arranged in a horizontal plane.

The length of the line displayed on the display device has been found to be proportional to the intensity of the incident sound and the square of its frequency. The frequency dependence may be avoided by integrating the dipole resultant signals via integrating means and applying the sum signal to the multiplier, rather than differentiating the sum signal and applying the dipole resultant signals to the multiplier.

Since the amplitude of the acoustic sound wave will often be inversely proportional to the range, a reading of the length of line displayed can provide an indication of distance of the hydrophone array from the source, where the source is a transmitter having a known output power, and knowing the attentuation introduced by the ambient medium.

Bearing accuracy is greatly increased by establishing dipole signals from more than two transducers. For instance, using eight transducers spaced equidistant around a circle, the upper frequency limit for a one degree bearing error has been found to be increased by a factor of five. The use of additional transducers also adds some redundancy, and hence reliability.

Figure 1A:
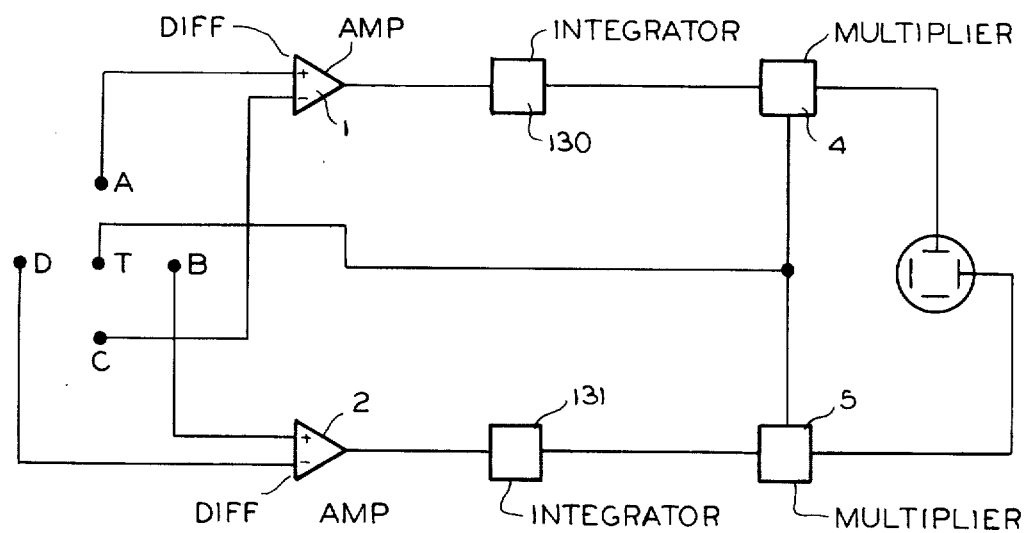
FIG. 1A is based on FIG. 1 except that it shows integration rather than differentiation means.

FIG. 1A shows integration rather than differentiation means. This FIG. 1A is the same as FIG. 1 except that the differentiation circuit 3 is removed and the sum signal is applied to the common multipliers 4 and 5 via integrating means in the form of integrators 130 and 131 interposed in the dipole signal paths extending between each of the differential amplifiers 1 and 2 and their respective multipliers 4 and 5.

Figure 2:
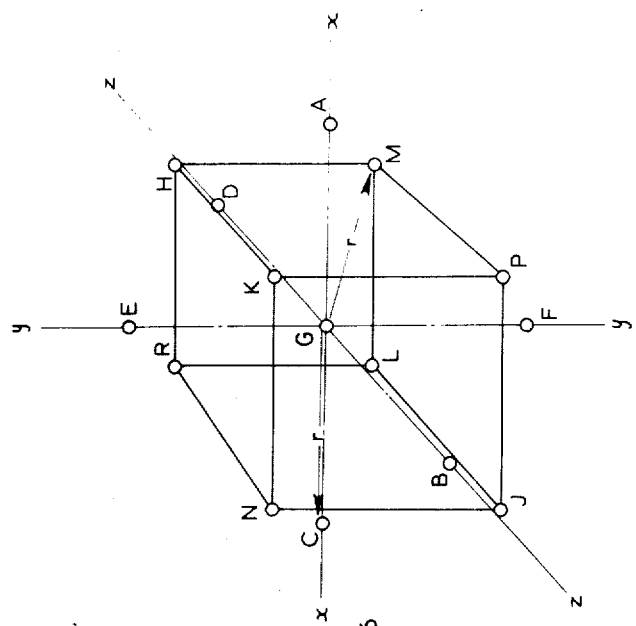
FIG. 2 shows a fourteen hydrophone array, on a three plane axis.

FIG. 2 shows a fifteen hydrophone array, arranged about a three orthogonal plane set of axes. The dipoles established are as follows: A-C, B-D, E-F, H-J, K-L, M-N, and P-R. Each individual transducer is located the same distance r from the origin of the axis, where a signal omnidirectional transducer G is located. The output signals from the individual dipoles may be combined so as to produce three mutually perpendicular dipole signals which may then be processed in a manner similar to that described below, and which will be understood by one skilled in the art.

Turning now to FIG. 3, a block diagram of the preferred form of the invention in more complex form is shown, but still utilizing two dipoles.

As shown in FIG. 1, the dipole of transducers A and C feeds differential amplifier 1, to provide a dipole resultant signal at its output, and the dipole of transducers B and D are connected to differential amplifier 2, to provide a dipole resultant signal at its output. The sum signal from transducer T is applied to differentiation circuit 3, to provide a common signal at its output, which is applied to multipliers 4 and 5 along with the output signals of different amplifiers 1 and 2 via gain control devices 17, 18 and 19 respectively in series with filteramplifiers 7, 8 and 11 and 11a.

The filter-amplifier units should have identical characteristics with respect to amplitude and phase as a function of frequency excepting only that the common signal path contains clipping circuit 11, which functions to clip the amplitude of the common signal. The result of this clipping is that the common signal is equivalent to a rationalized value of either +1 or −1. This signal is applied to multipliers 4 and 5, which act as polarity switches and so may be replaced by some other polarity switching means. This clipping will not degrade the bearing accuracy of this invention, although the length of the indication on the display device becomes proportional to received signal amplitude rather than intensity (intensity being proportional to the square of the amplitude). The filters employed should normally have a band-pass or low-pass characteristic.

Automatic gain control can also be used, although it must be tightly controlled, since relative gain changes between the two dipole signals will introduce bearing errors. Gain control applied to the sum signal alone will have a similar effect as the clipping described above, it is therefore necessary either to apply automatic gain control to all three signals, to clip the sum signal and apply automatic gain control to the two dipole resultant signals, or to clip the sum signal and apply automatic gain control to the three signals.

The block diagram of FIG. 3 shows the latter type of automatic gain control. Preferably squaring circuits 12 and 13 are individually connected to the respective outputs of multipliers 4 and 5. The squared individual signals are connected together to automatic gain control circuit 14, which has its output connected to inputs of gain control devices 17, 18 and 19. The automatic gain control circuit should have means 15 to provide a low pass characteristic in the feedback loop.

In operation, the circuit is adjusted so that the indication on the display device maintains a constant length, irrespective of the amplitude of the received acoustic signal.

Where the signal to be detected is reflected from an object, the transmitted signal can be used to initiate the cathode ray tube deflection circuitry. Such a circuit is shown in FIG. 3A. The transmitter 120 has an output connected to ramp signal generator 121, which applies its output to multipliers 122 and 123. The multipliers are respectively connected between the outputs of divider circuits 9 and 10 and the cathode ray tube X and Y deflection circuit inputs. A reflected signal from a source illuminated by the transmitted signal will be multiplied by the ramp signal triggered by the beginning of the transmitted pulse, and be displayed on the cathode ray tube, as described herein.

The sum of the outputs of the squaring circuits 12 and 13 is also applied to divider circuits 9 and 10 via a threshold device 16. The divider circuits are connected between the respective outputs of multipliers 4 and 5 and the X and Y deflection circuitry of a cathode ray tube 6. The output of the threshold device 16 remains constant unless its input exceeds some given level. When this level is exceeded, the output of the threshold device should be the square root of the input. The total effect of devices 9, 10 and 16 is to limit the length of the indication on the display device 6 to some maximum dimension.

It should be noted that where three dimensional information is required, at least one other dipole will be required in a third orthogonal plane relative to the two dimensional space defined by dipoles A-C and B-D. A channel for processing the dipole resultant signal in the Z plane will be similar to that for the other two dipoles. Elevation information will be obtained by comparing it with the signal received by one of the other dipoles, in the manner described above. This information can be displayed in a similar manner on a second display device, in order that bearing, or X-Y plane information is displayed on one display device, and elevation, in the Y-Z or X-Z plane would be shown on an adjacent display device.

FIG. 3B illustrates integration of the output signals. As described previously in connection with FIG. 1A, FIG. 3B differs from FIG. 3 in that the differentiating circuit 3 is removed and the sum signal in this case is applied directly to the gain control device 19. Integrating means in the form of integrators 130 and 131 are interposed in the dipole signal paths from the differential amplifiers 1 and 2 to the gain control devices 17 and 18.

FIG. 4 is a schematic diagram of the circuit to effect the aforenoted block diagram. In this circuit, there is no omni-directional hydrophone at the centre of the array; a circuit technique for adding the information in phase is shown.

Four hydrophones 20, 21, 22, and 23 are deployed about an X and Y axis as described earlier. Each is connected to a hydrophone pre-amplifier 24, 25, 26, and 27, the outputs of which is passed through individual resistors, preferably variable resistors 28, 29, 30 and 31. The purpose of the variable resistors is to ensure that the output signals therefrom are exactly identical for an identical amplitude signal, and that variations in the individual hydrophones or hydrophone pre-amplifiers will be compensated for so that the output display bearing angle will not be affected by such variations.

The compensated output signals of hydrophones 20 and 21 of one dipole are applied to differential amplifier 32, and the compensated output signals of hydrophones 22 and 23 of the second dipole are applied to differential amplifier 33. The differential output signal of amplifiers 32 and 33 are individually applied to low pass filters 34 and 35, in order to ensure that the signals which are being processed are of low enough frequency that the distance between individual hydrophones of each dipole is much shorter than a wavelength of the received acoustic signal.

The individual signals from the outputs of preamplifiers 24, 25, 26 and 27 are applied to a differentiating circuit made up of capacitors 36, 37, 38 and 39 respectively in series with buffer resistors 40, 41, 42 and 43, which are all connected together to operational amplifier 44, which has its second input grounded. The output of amplifier 44 is connected to low pass filter 45, which is identical to filters 34 and 35.

It may be seen that the output signals from filters 34 and 35 are dipoles resultant signals in two dimensions, and that the output signal of filter 45 is a differentiated common signal.

FIG. 4A illustrates schematically the same circuit as FIG. 4 with the provision that the dipole resultant signals are integrated and the differentiating circuit is removed. This is accomplished by removing capacitors 36, 37, 38 and 39 so there is no differentiating circuit. Then, the integration of the dipole signals may be accomplished by the integrators 132, 133, 134 and 135. The remainder of the FIG. 4A circuit remains the same as in FIG. 4. The output signals from filters 34 and 35 now will be integrated and the output signals from filter 45 will be a non-differentiated common signal.

All three signals are individually coupled through an R-C interstage coupling sircuit to multiplying circuits 46, 47 and 48. Resistor 49 which is connected to multiplying circuits 46 and 47 has a variable tap connected to a source of automatic gain control voltage, which will be described later, and serves to balance the amount of signal applied to both circuits 46 and 47. Variable resistor 50 which interconnects both multiplying means 46 and 47 has its tap connected to a bias source, in order to balance the two multipliers. The remainder of the resistors which are unreferenced provide a source of ground, operating potential, etc. as is well known in the art.

The output signals from multipliers 46 and 47 are applied to amplifiers 51 and 52. The resistor and capacitive networks attached thereto are well known in the art for the purpose of setting gain and the frequency response thereof. The output signals from amplifiers 51 and 52 are applied to multipliers 53 and 54.

Returning now to the common signal, the output signal from multiplying circuit 48 is applied to amplifier 55 which has a pair of Zener diodes 56 in serial opposed direction connected thereacross. The resultant output from the amplifier will be a clipped representation of the common signal, which is applied to multipliers 53 and 54. In the event hard clipping is used, multipliers 53 and 54 can simply be individual electronic switches as described earlier.

The output signals from multipliers 53 and 54 are individually applied to dividing circuits 57 and 58, which are basically inversely connected multipliers such as 46 and 47 as is well known in the art. The output signals of dividing circuits 57 and 58 are then applied through impedance correction circuitry such as resistor dividers 59 and 60 to the deflection circuitry of a display device (not shown), from terminals X and Y. The action of these dividing circuits is to keep the resulting output display device trace within reasonable limits on the fact thereof.

The operation of the automatic gain control circuit will now be described. The output signals from multipliers 53 and 54 are applied through squaring circuits 61 and 62 to operational amplifier 63. Thresholds of operation are set by bypass diode 64 connected thereacross, and the degree of feedback gain, which eventually results in a determination of the radius of the display line, is set by diode 65 in series with amplifier 63 with squaring circuit 66, connected to the same input as squaring circuits 61 and 62. The resultant output is applied to Zener diode 67, which has, in one constructed example, an operational voltage of about 8.2 volts. Therefore in the event the automatic gain control voltage exceeds 8.2 volts, an automatic gain control signal will pass through the following circuit. In the following circuit connected to the output of the Zener diode 67 is operational amplifier 68, which is bypassed by a capacitor, resistor, and diode network 69 which has a fast time constant. An isolation resistor 70 connects the output of operational amplifier 68 to operational amplifier 71.

Connected in parallel circuit comprising the Zener diode 67 in series with operational amplifier 68 and isolation resistor 70, is a slower time constant circuit. An ordinary diode 72 is connected to the output of diode 65, and allows feedback current to flow to series connected operational amplifier 73. Therefore current will flow in amplifier 73 at a significantly lower voltage level than that allowed by Zener diode 67: one diode threshold of conduction, about 0.7 volts. Operational amplifier 73 has as feedback circuit a slower time constant circuit 74, similar in construction to fast time constant circuit 69, but with different component values.

The output of operational amplifier 73 is connected via switch 74 to the input of operational amplifier 71.

In operation, if switch 74 is closed, the gain of the automatic gain control circuit is set by the gain of operational amplifier 73. However, in the event of high automatic gain control voltages appearing, in excess of 8.2 volts at the output of diode 65, the fast time constant circuit passing through operational amplifier 68 takes over. Accordingly, the resulting signal voltages within the unit are prevented from exceeding functional working values.

In the event switch 74 is kept open, the automatic gain control is non-functional, except for high feedback voltages in excess of the Zener diode 67 voltage, whereupon the circuit passing through operational amplifier 68 operates as a safety valve, keeping the display device trace within bounds.

The output of operational amplifier 73 is applied through isolation resistor 75 to the same input in amplifier 71 as is connected isolation resistor 70. The gain and bandpass of operational amplifier 71 is set by conventional feedback techniques which will not be described here. However it should be noted that the output from amplifier 71 is applied through diode 76 to multiplier 48, and equally to multipliers 46 and 47 as described earlier.

Hydrophones which are useful in the dipole transducers described are ATLANTIC RESEARCH Type LC-6, for frequencies in the range of 1 kHz to 30 kHz. Pre-amplifiers 24, 25, 26, and 27 can be ITHACO Type 143 or other low noise, high impedance input amplifiers. The differential amplifiers and operational amplifiers 32, 33, 34, 51, 52, 55, 63, 73, 68, and 71 can all be ANALOGUE DEVICES Type AD741J, AD511, or AD5-01A. Multipliers 46, 47, 48, 53, 54, 57, 58, and 61, 62, and 66 can all be Type AD532J from ANALOGUE DEVICES. Filters 34, 35 and 45 can be ITHACO Type 4210 series filters. Any electrostatic deflection oscilloscope capable of X-Y operation will suffice as the output display device and it has been found that the TEKTRONIX Type 604 is a suitable apparatus.

There exist at least three methods whereby one or more direction finders as described above may be used to locate the actual position of a sound emitting or scattering target.

1. As aforementioned, the received signal amplitude may be used as an inverse measure of target range from the direction finder. In this case, the sound source must possess a known source level. Calibrated 'pingers' or transponders may be used for such purposes.

2. Two such direction finders having hydrophone assemblies removed from one another by a known fixed distance, but having a common display device (such as a dual-beam oscilloscope), may be used to determine target range by the method of parallax. If the center of display positions of the two direction finders are separated on the display by a distance scaled the distance separating the sensor assemblies, the location of a sound emitting source will be indicated by the point at which the two display traces cross.

3. If a separate transmitter co-located with the direction finder transmits a sound pulse at a known instant, the time at which an echo or transponder signal is received may be used to calculate the range of the scattering body or transponder. This range may be displayed by the direction finder in the following manner.

It will be recalled that the effect of threshold device 16 together with dividing circuits 9 and 10 is to limit the length of the trace to some fixed value. The circuits may be adjusted so that all signals above some reasonable value will be sufficient to produce the maximum trace length. The maximum trace length may be caused to increase linearly with time beginning at the instant that the sound pulse is transmitted. Thus the greater the time delay between pulse transmission and echo reception, the greater the trace length. This action may be calibrated so that the exact target range is determined.

In a further refinement of this technique, all but the extreme outer end of the trace is suppressed so that target location is displayed by a single point. This display may then be interpreted in the same manner as a plan position indicator commonly used in many existing sonar and radar systems.

Any of several means may be used to cause the trace length to increase with time:

1. The threshold device 17 may be made to alter.
2. The gain of the deflection circuitry of the display device may be made to increase with time.
3. A further pair of multipliers may be inserted in series with each of the X and Y inputs of the display device.

These multipliers are then driven by the outputs of dividers 9 and 10 respectively and by the output of a ramp generator jointly.

The present invention is very useful in observing or supervising underwater diving operations, where each diver carries a transponder, which is illuminated from a transmitter. Where no transponder is used, in certain environments the source of noise may be diffused, and will result in a diffuse bearing line on the output display. However, it has been found that the centre of the line will usually define the proper bearing.

One skilled in the art understanding this invention may design numerous variations in structure. For instance, the filter function can be met by heterodyning the signals down in frequency, filtering, and then heterodyning up again in frequency. Furthermore, the multiplication operation may be done on the down-converted signals, and thus avoid a second heterodyning operation.

The various signal processing structures can be converted to their transfer functions by well known means and an algorithm derived which can be stored in an electronic computer. The computer therefore will substitute for the structure described, and the acoustic signals processed thereby.

The apparatus is of course not limited for use in water, as it is just as applicable for use in air.

These and other variations in internal structure and in the system itself are considered to be part of this invention, as within the scope of the appended claims.

The embodiments of the invention in which an exclusive property or privilege is claimed are defined as follows:

1. An acoustic signal direction finder comprising
   a. at least two dipole electro-acoustic transducer means disposed in quadrature,
   b. a pair of differential amplifiers, each connected to a respective transducer means for providing a pair of dipole resultant signals related to the acoustic pressure difference of the acoustic signal detected along each of the dipoles,
   c. integrating means connected to the output of the differential amplifiers,
   d. means for providing a common sum signal of the signal received by both transducer means in phase,
   e. a pair of first multiplying means to provide a pair of display deflection signals connected to the integrating means, the individual integrated signals being applied to the respective multiplying means, and further including means for applying the common signal to both of the multiplying means, and
   f. means for applying the deflection signals to deflection circuitry of a display device.

2. A direction finder as defined in claim 1, further including a pair of low pass filter means, each connected in series with the signal path between a differential amplifier and corresponding multiplier means, means for clipping the sum signal prior to its application to the multiplying means, gain controlling means connected in series with each signal path between a differential amplifier and corresponding low pass filter means as well as in series with the sum signal path and the means for clipping the sum signal, and an automatic gain control circuit connected in a feedback path between the outputs of each of the first multiplying means and inputs of the gain controlling means.

3. A direction finder as defined in claim 2, in which each dipole electro-acoustic transducer means is comprised of a pair of equally sensitive omni-directional pressure transducers spaced apart a distance much shorter than a wavelength of said acoustic signal to be processed thereby.

4. A direction finder as defined in claim 3 in which the display device is a cathode ray tube.

5. A direction finder as defined in claim 1, further including (i) a third dipole electro-acoustic transducer means disposed in quadrature relationship with the (a) means,
(ii) a differential amplifier connected to the (i) means for providing a third dipole resultant signal related to the acoustic pressure difference of said acoustic signal detected along the third dipole,
(iii) means for causing the third differential signal to be integrated relative to the sum signal, to provide a third dipole resultant signal,
(iv) a third multiplying means for providing a third display deflection signal,
(v) means for applying the third dipole resultant signal and the common signal to the third multiplying means, and
(vi) means for applying the third display deflection signal and one of said pair of deflection signals to a second display device.

* * * * *